Figure 1:
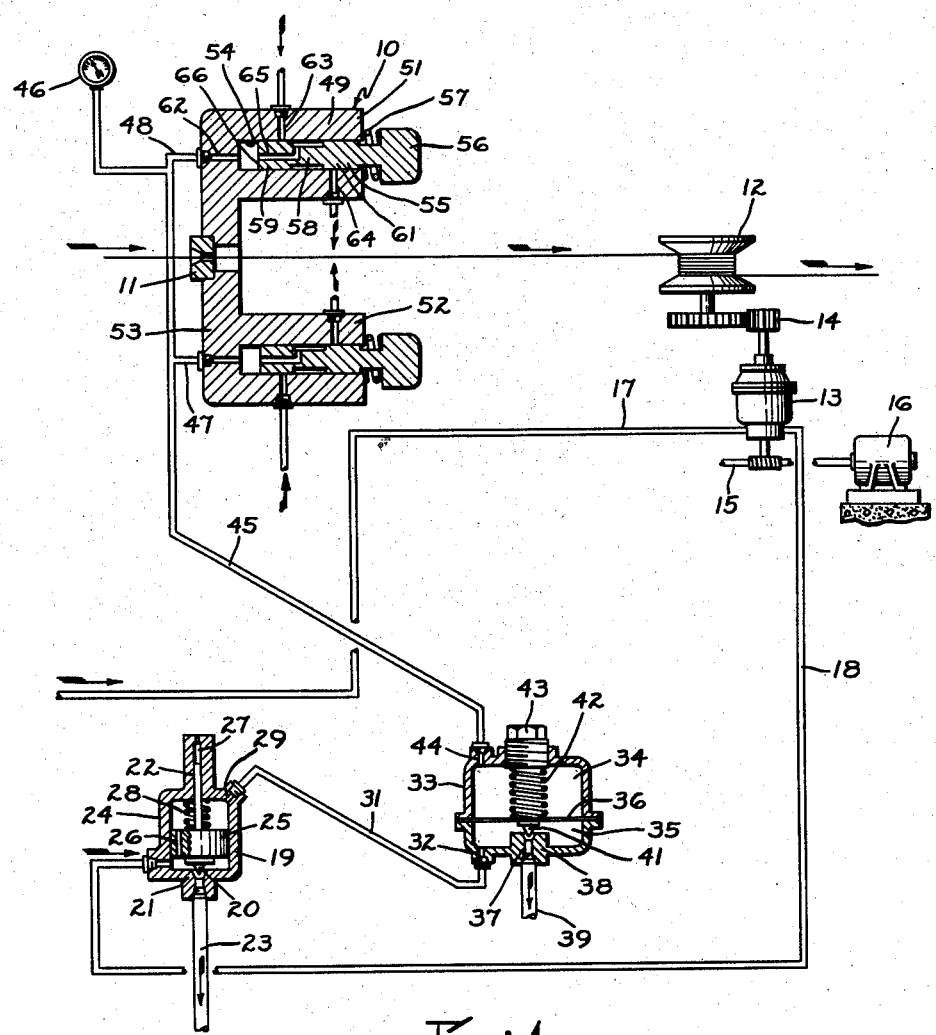

ved Oct. 20, 1959

2,909,275
CONTINUOUS WIRE-DRAWING MACHINE

John H. Hitchcock, Worcester, Mass., assignor to Morgan Construction Company, Worcester, Mass., a corporation of Massachusetts Application November 19, 1956, Serial No. 623,149

4 Claims. (Cl. 205—14)

This invention relates generally to continuous wire-drawing machinery and more particularly to apparatus for changing torque transmission to a block in response to changes in die reaction. This is a continuation-in-part of patent application Serial Number 267,276 filed January 19, 1952, now abandoned.

A continuous wire-drawing machine consists of a plurality of revolving blocks each connected to a common, driven jack-shaft by a clutch whose torque transmission characteristics may be changed as desired. It is normal practice to operate such a machine with the application of a fixed torque being determined by the particular drafting schedule, the size of the wire, etc. For a particular drafting schedule with a given wire size, the established back-pull at each die, determined by the torque transmitted to the preceding block, will remain constant provided the wire characteristics at the position, such as diameter and hardness, remain the same. However, the established back-pulls will increase or decrease with any increase or decrease of the initial wire diameter, for instance. If the wire variation is extreme, the back-pull may increase to a value that will cause the wire to break or, conversely, may decrease to a value that will develop slack wire with subsequent wire breakage when the slack is suddenly taken up. The present invention obviates these difficulties, as will be evident from the description which follows.

It is therefore an outstanding object of the invention to provide an apparatus for controlling the torque transmission to a block of a continuous wire-drawing machine in a manner responsive to changes in the diameter or quality of wire received by the machine.

Furthermore, it is an object of the present invention to provide an apparatus for controlling the torque delivered to the first drawing block of a continuous wire machine as a means of maintaining the back-pull preceding each die throughout the machine at a constant value regardless of the possible physical variations of the wire.

A further object of this invention is to provide an apparatus associated with the first die of a multi-block wire-drawing machine that will control the torque transmission to the first block of the machine in response to the reaction of said first die.

Another object of the invention lies in the provision of means for preventing extreme changes in back-pull between any block and its succeeding die throughout a multi-block, continuous wire-drawing machine upon changes in physical characteristics of the wire received by the machine.

Another object of this invention is the provision of apparatus for controlling the pressure of fluid passing through the hydraulic clutches of a wire-drawing machine in response to die reaction.

Although the novel features which are characteristic of this invention will be particularly pointed out in the claims appended hereto, the invention itself, as to its objects and advantages, the mode of its operation and the manner of its organization will be better understood by referring to the following description taken in connection with the accompanying drawings forming a part thereof, in which:

The single figure of the drawings is a generally schematic view of a portion of a wire-drawing machine constructed according to the principles of the present invention.

The present invention is intended to be used in connection with a multi-block continuous wire-drawing machine of the type described in the patent to Morgan No. 2,185,416 issued January 2, 1940. This type of wire-drawing machine makes use of hydraulic clutches to transmit torque from a main jack-shaft to the individual blocks. Each block is served by its own hydraulic clutch and the torque transmission of this clutch can be controlled by regulation of the pressure in the fluid passing through the clutch. According to the present invention, this is done by inserting a regulating valve between the clutch and the fluid discharge point and by controlling the opening of this valve in response to the forces acting on the preceding die.

Referring to the drawing, the apparatus of the invention, generally designated 10, is shown in use with elements of a wire-drawing machine, these elements being a die 11, a block 12, and a hydraulic clutch 13. The hydraulic clutch is of the type shown and described in the patent of Morgan et al. described above which clutch transmits torque in proportion to the pressure drop across the clutch. One side of the clutch 13 is connected to the block through a gear transmission 14 and the other side is connected by worm and pinion means 15 to an electric driving motor 16. Fluid enters the clutch 13 through a conduit 17 which is connected to a source of fluid, not shown; the clutch acts as a pump causing the fluid to flow through a conduit 18 back to the source. It is the nature of such a hydraulic clutch to transmit greater torque from the driven side to the output side when the pressure in the fluid is increased. A regulating valve 19 is inserted in the conduit 18 to control the pressure of the fluid. The valve 19 is of a well-known type for controlling pressure and has a valve member 20 which can be moved toward a valve seat 21 or away from it by the movement of a stem 22.

The output conduit 18 of the hydraulic clutch is connected to the inlet of the regulating valve 19 and the outlet of the valve is connected to a conduit 23 by which the fluid is returned to the source. The valve 19 has a cylindrical body 24 within which is slidably mounted a piston 25 which is provided with a bleeder passage 26. To one side of the piston 24 is attached the valve member 20 which is adapted to move toward and away from contact with the valve seat 21. To the other side of the piston 25 is attached the rod 22 which is slidably mounted in a guide recess 27. A coil spring 28 surrounds the rod 22 and biases the piston 25 toward a position in which the valve member 20 is in contact with the seat 21 and the valve is closed. The portion of the cylinder body in which the spring 28 resides is provided with an outlet opening 29 to which is connected a conduit 31. The conduit 31 is connected at the other end to the inlet 32 of a diaphragm-type differential pressure pilot valve 33. The pilot valve 33 is divided, in its intermediate portion, into an upper and a lower chamber 34 and 35, respectively, by a diaphragm 36. The inlet 32 opens into the lower chamber 35 as does an outlet 37 which is surrounded by a valve seat 38. A conduit 39 is connected to the outlet 37, whereby the fluid passing therethrough returns to the source of fluid. Attached to the center of the diaphragm 36 and shaped to fit the valve seat 38 is a valve member 41. On the other side of the diaphragm in the chamber 34 is situated a coil spring 42 which extends between the diaphragm and an adjustable plug 43 threaded into the top of the valve 33. The valve seat 38, the valve member 41, the spring 42, and the plug 43 are in alignment. An inlet opening 44 is provided into the chamber 34 and to this opening is connected a conduit 45.

The conduit 45 has connected thereto a gage 46 for indicating fluid pressures within the conduit. The conduit 45 is also connected to conduits 47 and 48 which lead to a die support 49. The die support 49 is of a generally U-shaped configuration, having two legs 51 and 52, respectively, and an intermediate portion 53. The die 11 is fastened to the center of the intermediate portion, the path of the wire being the axis of symmetry for the support and its associated parts. One side only of the support 49 and the elements associated therewith will be described, it being understood that the other side will be similar in construction and function. The leg 51 of the support 49 is formed with a bore 54 parallel to the direction of wire travel and in this bore is slidably mounted a piston 55, the bore and piston constituting a control valve. The support 49 is slidably mounted on the bed of the machine by any of several well-known means while the piston 55 is fixed immovably to a portion 56 of the bed, a resilient means such as coil spring 57 may be interposed between the die support and a portion of the bed. It can be seen then that the support is free to move in the direction of the wire travel and that the walls of the bore 54 are free to slide relative to the fixed piston 55. The piston 55 has a reduced central portion 58 which divides the piston into two end portions 59 and 61, respectively. The end portions fit snugly in the bore 54, whereas there is a considerable annular space between the reduced portion and the bore. A passage 62 passes through the die support into the bore 54 in the end thereof adjacent the portion 59 of the piston; it is to this passage 62 that the conduit 48 is connected. Passages 63 and 64 also pass through the support into the bore 54 in the intermediate portion thereof. The passages 63 and 64 open into the bore at points spaced from one another by a distance slightly greater than the distance between the two end portions 59 and 61 of the piston 55, so that the end portions of the piston may cover both passages at one time, but may uncover one of them by a slight axial movement of the piston. The opening of the passages 63 and 64 into the bore may comprise annular grooves in the wall of the bore. A passage 65 passes through the piston from the surface 66 of the head and opens on the surface of the reduced portion 58 thereof. The external opening of the passage 63 is connected to a source of fluid under pressure, preferably a source of constant pressure and one which is separate from the source used in the hydraulic clutches of the machine. The external opening of the passage 64 is connected to a sump tank of the fluid source.

The operation of this embodiment is as follows: When no wire is passing through the die, the spring 57 holds support 49 in such a position that port 64 opens into the annular space surrounding the reduced portion 58 of the piston and thus provides direct communication between bore 54 and the fluid source which remains at atmospheric pressure. Port 63 connected to the high pressure source is blocked by piston end 59. When wire enters the die and the force required for drawing is applied to support 49, the latter moves slightly in the direction of drawing, compressing spring 57 and closing port 64. Fluid then is trapped between bore 54 and head 66, and is subjected to a pressure which is directly proportional to the drawing force. This pressure is indicated by gage 46, and is transmitted to the upper chamber 34 of the diaphragm-type pilot valve 33. Because fluid leakage will occur slowly through the small clearance space between piston 55 and bore 54, support 49 will tend to move very slowly in the direction of wire travel. When this motion proceeds far enough to open port 63 to the annular passage around reduced portion 58 of the piston, fluid under pressure enters through port 63 and restores support 49 to its normal operating position by the pressure on the head 66.

The fluid pressure, proportional to drawing force and transmitted to chamber 34, provides a nominal setting for pilot valve 33, which in turn establishes a level of pressure in conduit 31. This controls the opening of valve 19 and establishes through conduit 18 a level of pressure and torque in the hydraulic clutch which corresponds to the prevailing value of drawing force. If the drawing force is increased by an increase in diameter of the entering wire, for instance, the fluid pressure is increased in conduit 45 and chamber 34; and, through the resulting automatic readjustment of valves 33 and 19, the pressure and torque developed by the hydraulic clutch are increased to match the increased drawing force. This process is fully automatic throughout a limited range of variation of drawing force; manual adjustment of plug 43 serves to regulate pressure and torque for large changes of drawing force, such as are required when drawing of one order has been completed and a new schedule is undertaken involving different reduction or wire of a different character.

Similarly, if the drawing force is decreased by a diminution of entering wire size, for instance, the fluid pressure in chamber 34 is decreased, and through automatic readjustment of valves 33 and 19 the pressure and torque at the hydraulic clutch are decreased to match the smaller drawing force. Thus this embodiment likewise serves to prevent significant and serious changes of back pull in the wire leaving the block which otherwise would result from changes in drawing force.

The diaphragm type, differential-pressure valve 33 serves essentially as a pilot valve to control the pressure above piston 25 of the main pressure control valve 19. The pilot valve 33 deals with only a small quantity of fluid, as compared to main valve 19, and for this reason can achieve a close regulation of pressure in discharge duct 18 with only slight motion of diaphragm 36. Consequently only slight motion of the die support 49, with respect to the pistons fixed in abutment 56, is required for pressure control. However, leakage of fluid may occur, allowing piston 66 to approach the end of bore 54. In this event passage 63 gains access to the portion of reduced diameter 58 on piston 61, allowing fluid under pressure to enter through inlet 63 and returning support 49 to its normal position with inlet 63 closed. Similarly, if support 49 were to move too far in the opposite direction, because of fluid leakage from inlet 63 into bore 54, the outlet passage 64 would gain access to the reduced portion 58, allowing excess fluid to escape and restoring support 49 to its normal position.

While certain novel features of the invention have been shown and described and are pointed out in the annexed claims, it must be understood that various omissions, substitutions, and changes in the forms and details of the device illustrated and in its operation may be made by those skilled in the art without departing from the essence of the invention.

The invention having thus been described, what is claimed as new and desired to secure by Letters Patent is:

1. A continuous wire-drawing machine, comprising a base, a die, a block following said die, a driving means for said block, a hydraulic clutch connecting the driving means to the block, said clutch having the characteristic of torque transmission dependent upon the differential in fluid pressure across the clutch, a support for said die, said support comprising one element of a control valve of a hydraulic system, said support being mounted on said base so that it may move relative to the base in line with wire travel in response to changes in die reaction, another element of the control valve fixed relative to the base and cooperating with the said one element, a valve regulating the pressure of fluid in said clutch, the hydraulic control system being connected to the valve so that the pressure may change in response to movement relative to the base of said support.

2. A continuous wire-drawing machine, comprising a base, a die mounted on the base, a block mounted on the base and following the said die, a driving means for said block, said means including a clutch, said clutch having the characteristic of torque transmission dependent upon the differential in fluid pressure across the clutch, a die support having a bore, said bore comprising one element of a control valve, said support being mounted on said base so that it may move relative to the base in line with wire travel in response to changes in die reaction, a piston element of the control valve fixed relative to the base and located for sliding within the said bore, a second valve regulating the pressure of fluid in said clutch, the control valve being connected to the second valve so that the pressure across the clutch may change in response to movement relative to the base of said support.

3. A continuous wire-drawing machine, comprising a die, a block following said die, the die and block being the first die and block, respectively, of the machine, a driving means for said block, a hydraulic clutch connecting the driving means to the block, said clutch having the characteristic of torque transmission dependent upon the differential in pressure across the clutch, a hydraulic control system, a control valve for said system, a support constituting a movable element of said control valve slidably mounted on said machine, the die mounted on said support, resilient means biasing said support, the support being movable in response to changes in die reaction, a valve regulating the differential in pressure across the clutch, the hydraulic control system being connected to said regulating valve so that the said differential in pressure changes in response to movement of the support.

4. A continuous wire-drawing machine, comprising a base, a die, a block following said die, the die and block being the first die and block, respectively, of the machine, a driving means for said block, a hydraulic clutch connecting the driving means to the block, said clutch having the characteristic of torque transmission dependent upon the pressure in the fluid passing therethrough, a hydraulic control system, a control valve for said system, a support having a bore constituting an element of said control valve slidably mounted on said base, the die mounted on said support, a piston fixed to the base for cooperation with the bore, resilient means biasing said support, the support being movable relative to the base in response to changes in die reaction, a valve regulating the fluid pressure in said clutch, the hydraulic control system being connected to said regulating valve so that the pressure changes in response to movement of the support.

References Cited in the file of this patent

UNITED STATES PATENTS

| | | |
|---|---|---|
| 1,637,109 | Honig | July 26, 1927 |
| 2,003,475 | Shipp | June 4, 1935 |
| 2,205,213 | Lessmann | June 18, 1940 |
| 2,263,246 | Morgan | Nov. 18, 1941 |
| 2,370,481 | Morgan | Feb. 27, 1945 |
| 2,432,191 | Chilton | Dec. 9, 1947 |
| 2,462,558 | Scheuermann et al. | Feb. 22, 1949 |
| 2,646,150 | Hobbs | July 21, 1953 |
| 2,748,925 | Wilson | June 5, 1956 |

FOREIGN PATENTS

| | | |
|---|---|---|
| 264,039 | Switzerland | Dec. 16, 1949 |